United States Patent
Pydin

(10) Patent No.: US 10,774,918 B2
(45) Date of Patent: Sep. 15, 2020

(54) POWER TRANSMISSION DEVICE

(71) Applicant: Honda Motor Co., Ltd., Tokyo (JP)

(72) Inventor: Andrii Pydin, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/451,026

(22) Filed: Jun. 25, 2019

(65) Prior Publication Data

US 2020/0072336 A1 Mar. 5, 2020

(30) Foreign Application Priority Data

Aug. 28, 2018 (JP) ................. 2018-159760

(51) Int. Cl.
| | |
|---|---|
| *F16H 57/021* | (2012.01) |
| *F16H 57/031* | (2012.01) |
| *F16C 19/36* | (2006.01) |

(52) U.S. Cl.
CPC ......... *F16H 57/021* (2013.01); *F16C 19/364* (2013.01); *F16H 57/031* (2013.01); *F16C 2326/06* (2013.01)

(58) Field of Classification Search
CPC .... F16H 57/021; F16H 57/031; F16H 57/039; F16H 57/023; F16H 2057/02091; F16H 2057/02086
See application file for complete search history.

(56) References Cited

U.S. PATENT DOCUMENTS

2016/0363207 A1\* 12/2016 McGarry .............. F16H 57/031

FOREIGN PATENT DOCUMENTS

| JP | 2000297851 A | \* | 10/2000 |
| JP | 2009185970 A | \* | 8/2009 |
| JP | 2015168392 | | 9/2015 |

\* cited by examiner

*Primary Examiner* — Luis A Gonzalez
(74) *Attorney, Agent, or Firm* — JCIPRNET

(57) ABSTRACT

A power transmission device is provided which can avoid an increase in pressure applied to bearings even when a dimension of thickness of a case is small or when a gear supported by a rotary shaft has a large dimension of diameter. The power transmission device includes: a hollow rotary shaft; a first case configured to support one end portion of the rotary shaft via a first bearing; a second case configured to support the other end portion of the rotary shaft via a second bearing; a shaft component disposed on an inner side of the rotary shaft; a first fixer configured to fix one end portion of the shaft component to the first case; and a second fixer configured to fix the other end portion of the shaft component to the second case.

4 Claims, 3 Drawing Sheets

Enlargement of X

POWER TRANSMISSION DEVICE

CROSS-REFERENCE TO RELATED APPLICATION

This application claims the priority benefits of Japan Patent Application No. 2018-159760, filed on Aug. 28, 2018. The entirety of the above-mentioned patent application is hereby incorporated by reference herein and made a part of this specification.

BACKGROUND

Technical Field

The disclosure relates to a power transmission device including a rotary shaft arranged inside a case and a bearing supporting the rotary shaft.

Related Art

Conventionally, in a power transmission device that transmits power from a driving source of a vehicle to driving wheels, as shown in patent literature 1 for example, a supporting structure utilizing a tapered roller bearing is employed as the supporting structure that supports a rotary shaft. In the supporting structure utilizing the tapered roller bearing, when the power transmission device is assembled, the bearing is sandwiched between a body case that accommodates the rotary shaft or the bearing and a cover component that is installed covering the body case. Then, pressure applied to the bearing is set by adjusting a fastening force of a bolt that fastens the body case and the cover component.

That is, in the conventional power transmission device, tolerance of the case (tolerance between the body case and the cover component which sandwiches the bearing) is measured, a spacer component having an appropriate dimension of thickness is accordingly inserted between the case and the bearing, and a nut arranged at the end portion of the rotary shaft is tightened in this state to fix the bearing. Subsequently, the case-fixing bolt that fastens the case body and the cover component is tightened and thereby pressure is applied to the bearing.

However, in the supporting structure of the rotary shaft assembled by the conventional approach, when an axial load is applied to the rotary shaft, the load is applied to only part of the case body or the cover component via one bearing. Therefore, when the dimension of thickness of the case (wall thickness) is small, or when a gear supported by the rotary shaft has a large dimension of diameter and the like, the rigidity of the case is reduced, and thus the pressure applied to the bearing is required to be increased. When the pressure applied to the bearing is increased in this way, there is a risk that negative effect is exerted on the durability of the bearing.

LITERATURE OF RELATED ART

Patent Literature

[Patent Literature 1] Japanese Laid-Open No. 2015-168392

The disclosure provides a power transmission device that can avoid an increase in pressure applied to the bearings even when the dimension of thickness of the case is small or when the gear supported by the rotary shaft has a large dimension of diameter.

SUMMARY

The power transmission device of the disclosure includes: a rotary shaft (20) being hollow; a first case (12) configured to support one end portion (20*a*) of the rotary shaft (20) via a first bearing (32); a second case (13) configured to support the other end portion (20*b*) of the rotary shaft (20) via a second bearing (33); a shaft component (40) disposed on an inner side of the rotary shaft (20); a first fixer (42) configured to fix one end portion (40*a*) of the shaft component (40) to the first case (12); and a second fixer (43) configured to fix the other end portion (40*b*) of the shaft component (40) to the second case (13).

According to the power transmission device of the disclosure, when the axial load acts on the rotary shaft, the load acts on any one of the first case and the second case via any one of the first bearing and the second bearing that support the rotary shaft. The load is further applied to the shaft component from any one of the first case and the second case via any one of the first fixer and the second fixer and applied to the other of the first case and the second case from the shaft component via the other of the first fixer and the second fixer. Accordingly, the axial load that acts on the rotary shaft can be received by both the first case and the second case. Therefore, conventionally, the axial load applied to the rotary shaft is received by only one of the first case and the second case; in contrast, in the power transmission device of the disclosure, the load can be received by both the first case and the second case. Accordingly, because the load applied from the rotary shaft to the case is dispersed, the dimension of thickness of the case (in particular, the thickness of the first case and the second case) can be further reduced. In addition, because the rigidity of the case increases, the pressure applied to the bearing can be smaller than before, and the durability of the bearing can be improved.

DESCRIPTION OF THE EMBODIMENTS

Figure 1:
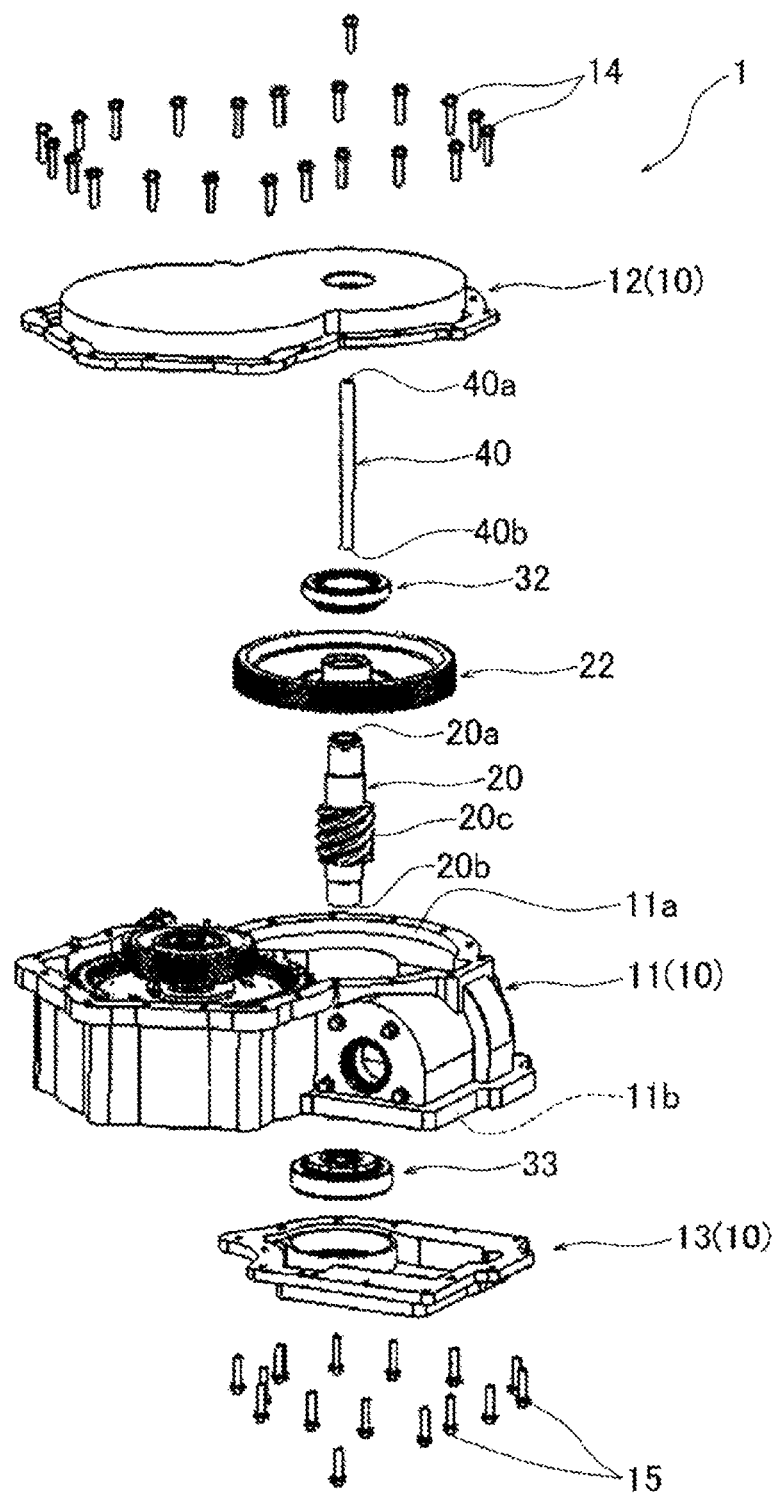
FIG. 1 is an exploded perspective view showing structural components of a power transmission device of one embodiment of the disclosure.

In this case, the first bearing (32) and the second bearing (33) may be bearings such as tapered roller bearings and the like that are capable of receiving both the load applied in a radial direction of the rotary shaft (20) and the load applied in an axial direction. Besides, in the power transmission device of the disclosure, the first case (12) may be a first cover component installed covering an opening portion (11*a*) on the side of the one end portion (20*a*) of the rotary shaft (20) in the body case (11) that accommodates the rotary shaft (20), the second case (13) may be a second cover component installed covering an opening portion (11*b*) on the side of the other end portion (20*b*) of the rotary shaft (20) in the body case (11), the first fixer (42) may be a bolt that fixes the first case (12) to the one end portion (40*a*) of the shaft component (40), and the second fixer (43) may be a bolt that fixes the second case (13) to the other end portion (40*b*) of the shaft component (40).

According to this configuration, in the power transmission device that has the structure in which two end portions of the rotary shaft disposed inside the body case are supported by the first cover component and the second cover component, the axial load applied to the rotary shaft can be received by both the first cover component and the second cover component, and thus the dimension of thickness of the first cover component and the second cover component can be reduced. Therefore, the power transmission device can be simplified in configuration and be light weighted.

Moreover, the symbols inside the brackets are shown for reference with diagram reference numbers of corresponding configuration elements in embodiments described later.

According to the power transmission device of the disclosure, even when the dimension of thickness of the case is small, or when the gear supported by the rotary shaft has a large dimension of diameter, an increase in the pressure applied to the bearing can be avoided.

Figure 2:
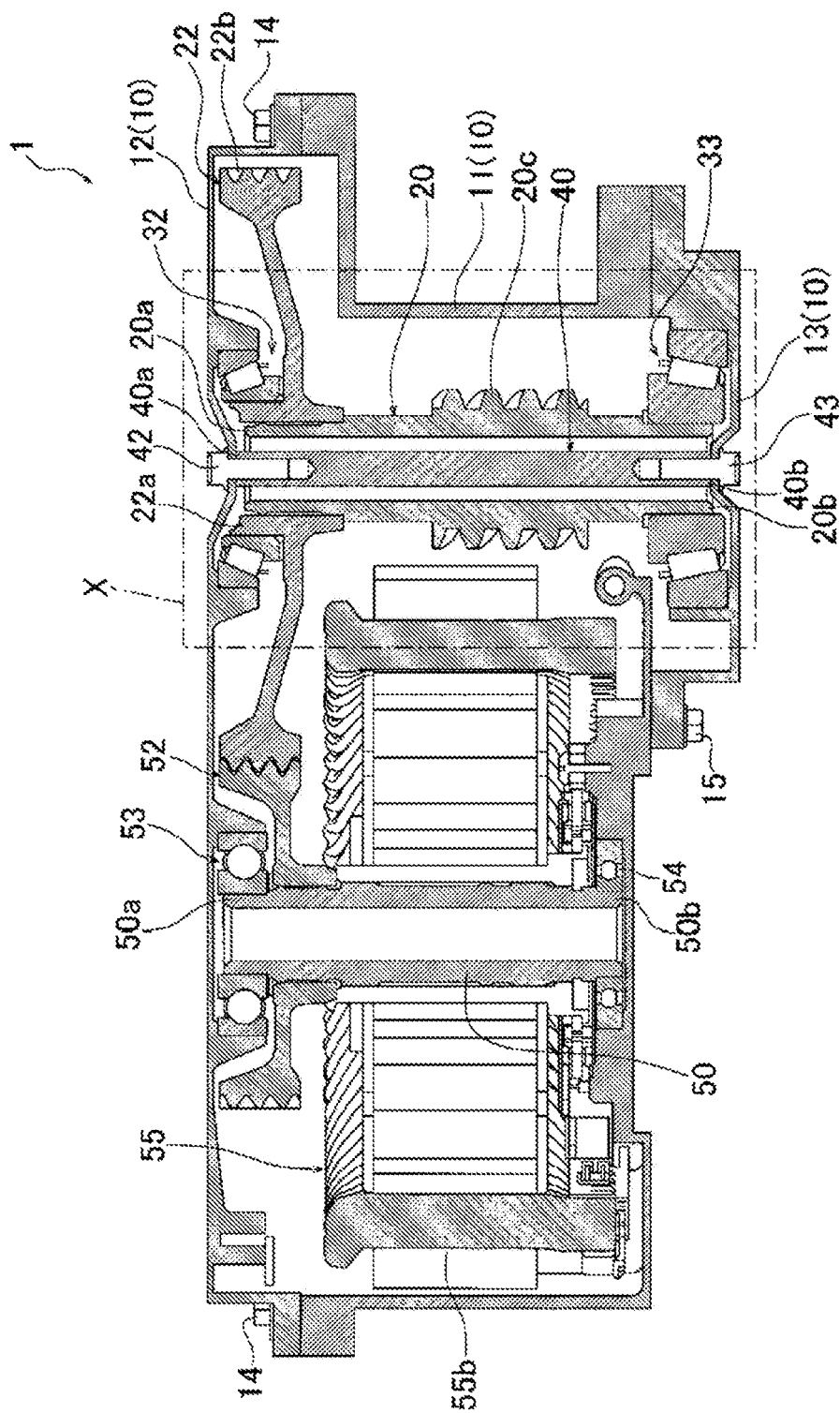
FIG. 2 is a side cross-sectional view showing a structure inside an external case of the power transmission device.

In the following, embodiments of the disclosure are described with reference to accompanying drawings. FIG. 1 is an exploded perspective view showing structural components of a power transmission device 1 of one embodiment of the disclosure. Besides, FIG. 2 is a side cross-sectional view showing a structure inside an external case of the power transmission device. Moreover, in the description below, upper and lower or right and left refers to the upper and lower or right and left in the direction shown in FIG. 1 and FIG. 2. As shown in these diagrams, in the power transmission device 1 of this embodiment, structural components are accommodated inside an external case 10, and the external case 10 includes a substantially tubular body case 11 having an upper end surface and an lower end surface being opened, and a upper case (a first case, a first cover component) 12 and a substantially plate-like lower case (a second case, a second cover component) 13 being substantially plate-like which are installed covering an opening portion 11a of the upper end surface of the body case 11 and an opening portion 11b of the lower end surface respectively. The upper case 12 and the lower case 13 are respectively fixed to the body case 11 by the fastening of a bolt 14 and a bolt 15.

On one side inside the body case 11 (the right side in FIG. 2), a hollow tubular rotary shaft (hollow shaft) 20 in which the axial direction extends vertically and a gear 22 fixed to an upper end portion 20a of the rotary shaft 20 are disposed. The rotary shaft 20 is rotatably supported by a pair of tapered roller bearings 32, 33 disposed on an outer circumference of the upper end portion 20a and an outer circumference of a lower end portion 20b. The tapered roller bearing 32 on the upper side supports the rotary shaft 20 with respect to the upper case 12, and the tapered roller bearing 33 on the lower side supports the rotary shaft 20 with respect to the lower case 13. Besides, on an inner side of the hollow rotary shaft 20, a reinforcement shaft (shaft component) 40 is disposed. The reinforcement shaft 40 is coaxially disposed in a shaft center of the rotary shaft 20 and is a solid cylindrical shaft that has an external diameter smaller than an internal diameter of the rotary shaft 20, in which an upper end portion 40a is fixed to the upper case 12 by the fastening of an upper fixing bolt (a first fixer) 42 (see FIG. 2) and a lower end portion 40b is fixed to the lower case 13 by the fastening of a lower fixing bolt (a second fixer) 43 (see FIG. 2). The upper fixing bolt 42 is inserted from above the upper case 12 and downward to the upper end portion 40a (upper end surface) of the reinforcement shaft 40 penetrating the upper case 12, and the lower fixing bolt 43 is inserted from below the lower case 13 and upward to the lower end portion 40b (lower end surface) of the reinforcement shaft 40 penetrating the lower case 13. Therefore, the upper case 12 and the lower case 13 are mutually joined by the reinforcement shaft 40, the upper fixing bolt 42 and the lower fixing bolt 43.

In a gear 22, a tubular flange portion 22a that extends in an axial direction is formed on the base section of the gear 22. The flange portion 22a is fixed to an outer circumferential surface of the upper end portion 20a of the rotary shaft 20, and an outer circumferential surface of the flange portion 22a is supported at the tapered roller bearing 32 on the upper side. Besides, the gear 22 has teeth 22b formed on an outer circumferential edge. In addition, on the outer circumferential surface of a middle portion in the axial direction of the rotary shaft 20, a gear portion (teeth portion) 20c including helical concavity and convexity (helical gear) is formed. The gear portion 20c engages with other gears and the like that are not shown.

In addition, on the other side inside the body case 11 (the left side in FIG. 2), another rotary shaft 50 in which the axial direction extends vertically and a gear 52 fixed near an upper end portion 50a of the rotary shaft 50 are disposed. The rotary shaft 50 is rotatably supported by a ball bearing 53 disposed on the outer periphery of the upper end portion 50a and a ball bearing 54 disposed on the outer periphery of a lower end portion 50b. Besides, on the outer periphery of a middle portion of the rotary shaft 50, another gear 55 is rotatably supported with respect to the rotary shaft 50. In the gear 55, teeth 55b formed on the circumferential edge engage with still other gears that are not shown.

In the power transmission device 1 with the aforementioned structure, power is transmitted between the rotary shaft 20 and the rotary shaft 50 via the gear 22 and the gear 52.

Figure 3:
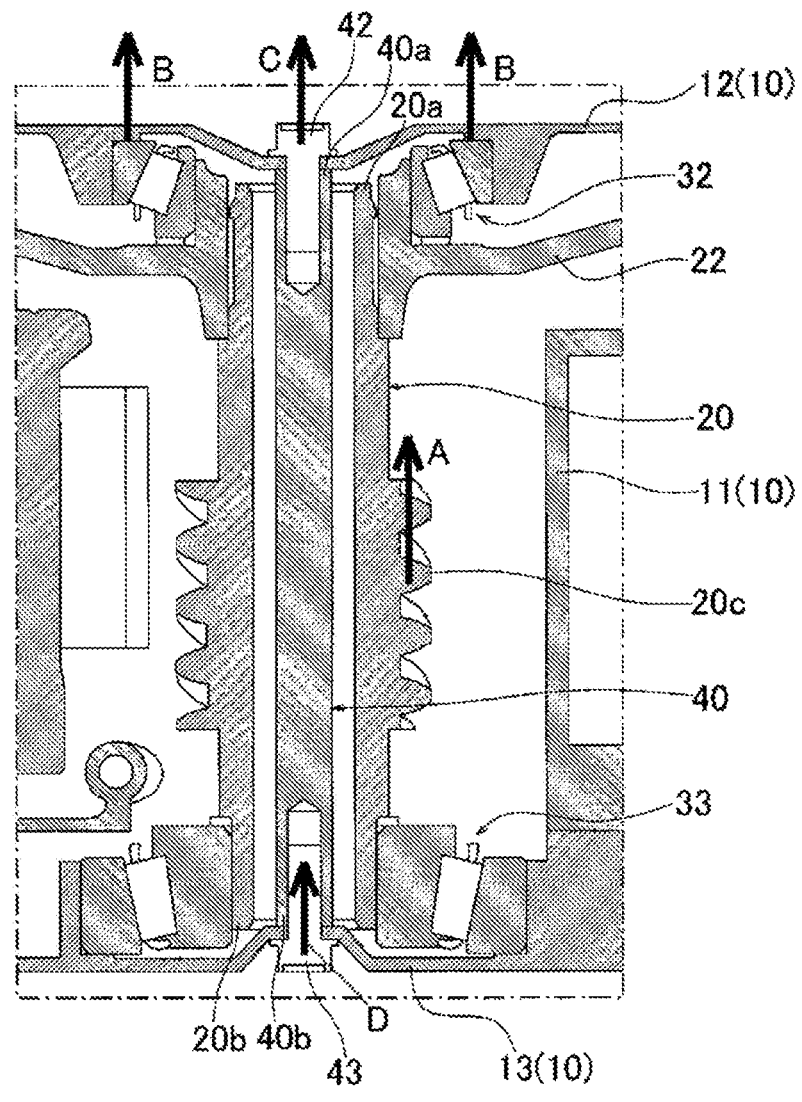
FIG. 3 is a diagram for explaining loads applied to a rotary shaft and the external case (an upper case and a lower case) and is a partially enlarged view of an X section in FIG. 2.

FIG. 3 is a diagram for explaining loads applied to the rotary shaft 20 and the external case 10 (the upper case 12 and the lower case 13) and is a partially enlarged view of an X section in FIG. 2. In the power transmission device 1 of this embodiment, by the gear portion 20c arranged on the rotary shaft 20 being a helical gear, the axial load is applied from the gear portion 20c to the rotary shaft 20. In contrast, by being equipped with a structure in which the upper case 12 and the lower case 13 are joined by the reinforcement shaft 40 disposed on the inner side of the hollow rotary shaft 20, when the axial load is applied to the rotary shaft 20, the load acts as follows.

(1) As shown by an arrow A in FIG. 3, the load in the axial direction (upward direction in FIG. 3) is applied from the gear portion 20c to the rotary shaft 20.

(2) As shown by an arrow B in FIG. 3, the upward load applied to the rotary shaft 20 is transmitted to the upper case 12 via the tapered roller bearing 32 on the upper side.

(3) By the upward load applied from the tapered roller bearing 32 to the upper case 12, as shown by an arrow C in FIG. 3, the upward load (tensile load) acts on the reinforcement shaft 40 via the upper fixing bolt 42.

(4) As shown by an arrow D in FIG. 3, the upward load (tensile load) is applied from the reinforcement shaft 40 to the lower case 13 via the lower fixing bolt 43.

(5) Accordingly, the load applied from the gear portion 20c to the rotary shaft 20 is received by both the upper case 12 and the lower case 13.

In this way, in contrast to that the axial load (upward load) applied from the gear portion 20c to the rotary shaft 20 is received only by the upper case 12 in the conventional structure, in the power transmission device 1 of this embodiment, by being equipped with the reinforcement shaft 40 that joins the upper case 12 and the lower case 13, the load is received by both the upper case 12 and the lower case 13. Therefore, because the load applied from the rotary shaft 20 to the external case 10 (the upper case 12 and the lower case 13) is dispersed, the thickness of the external case 10 (the upper case 12 and the lower case 13) can be further reduced. Besides, because the rigidity of the external case 10 (the upper case 12 and the lower case 13) increases, the pressure applied to the tapered roller bearings 32, 33 can be reduced than before. Therefore, the durability of the tapered roller bearings 32, 33 can be improved.

The embodiment of the disclosure is described above, but the disclosure is not limited to the aforementioned embodiment and various modifications can be made within the scope of the claims and the scope of the technical ideas put forth in the specification and the diagrams. For example, in the aforementioned embodiment, a case in which the bearings 32, 33 are tapered roller bearings is shown, but the bearings of the power transmission device of the disclosure that support the rotary shaft are not limited to the tapered roller bearings shown in the aforementioned embodiment and may be other types of bearings as long as the bearings are capable of receiving both the load applied in the radial direction of the rotary shaft and the load applied in the axial direction.

What is claimed is:

1. A power transmission device, comprising:
   a rotary shaft being hollow;
   a first case configured to support one end portion of e rotary shaft via a first bearing;
   a second case configured to support another end portion of the rotary shaft via a second bearing;
   a shaft component disposed on an inner side of the rotary shaft;
   a first fixer configured to fix one end portion of the shaft component to the first case through being inserted from the first case to the shaft component and penetrating the first case; and
   a second fixer configured to fix another end portion of the shaft component to the second case through being inserted from the second case to the shaft component and penetrating the second case.

2. The power transmission device according to claim 1, wherein the first bearing and the second bearing are bearings capable of receiving both a load applied in a radial direction of the rotary shaft and a load applied in an axial direction.

3. The power transmission device according to claim 2, wherein the first bearing and the second bearing are tapered roller bearings.

4. The power transmission device according to claim 1, wherein
   the first case is a first cover component installed covering an opening portion on the side of the one end portion of the rotary shaft in a body case that accommodates the rotary shaft,
   the second case is a second cover component installed covering an opening portion on the side of the other end portion of the rotary shaft in the body case,
   the first fixer is a bolt that fixes the first case to the one end portion of the shaft component, and
   the second fixer is a bolt that fixes the second case to the other end portion of the shaft component.

* * * * *